(12) United States Patent
Yang et al.

(10) Patent No.: US 9,215,040 B2
(45) Date of Patent: Dec. 15, 2015

(54) HYBRID IN-BAND/OUT-OF-BAND RELAYS

(71) Applicant: FutureWei Technologies, Inc., Plano, TX (US)

(72) Inventors: Yunsong Yang, Schaumburg, IL (US); Zhongfeng Li, Shanghai (CN); Philippe Sartori, Algonquin, IL (US)

(73) Assignee: Futurewei Technologies, Inc., Plano, TX (US)

( * ) Notice: Subject to any disclaimer, the term of this patent is extended or adjusted under 35 U.S.C. 154(b) by 288 days.

(21) Appl. No.: 13/624,490

(22) Filed: Sep. 21, 2012

(65) Prior Publication Data

US 2013/0077542 A1 Mar. 28, 2013

Related U.S. Application Data

(60) Provisional application No. 61/538,597, filed on Sep. 23, 2011.

(51) Int. Cl.
| | | |
|---|---|---|
| *H04W 88/04* | (2009.01) | |
| *H04L 1/18* | (2006.01) | |
| *H04B 7/155* | (2006.01) | |
| *H04L 5/00* | (2006.01) | |
| *H04W 72/04* | (2009.01) | |
| *H04W 84/04* | (2009.01) | |

(52) U.S. Cl.
CPC .......... *H04L 1/1854* (2013.01); *H04B 7/15542* (2013.01); *H04L 5/0037* (2013.01); *H04W 72/0453* (2013.01); *H04W 72/0426* (2013.01); *H04W 84/047* (2013.01); *H04W 88/04* (2013.01)

(58) Field of Classification Search
USPC ............. 370/277, 280, 315, 329, 330; 455/11
See application file for complete search history.

(56) References Cited

U.S. PATENT DOCUMENTS

| | | | |
|---|---|---|---|
| 2011/0103269 A1 | 5/2011 | Zheng | |
| 2012/0063383 A1* | 3/2012 | Barbieri et al. | ............... 370/315 |
| 2012/0201191 A1* | 8/2012 | Seo et al. | ....................... 370/315 |
| 2013/0315109 A1* | 11/2013 | Raaf et al. | ..................... 370/277 |

FOREIGN PATENT DOCUMENTS

| | | |
|---|---|---|
| CN | 102119570 | 7/2011 |
| EP | 2501057 A1 | 9/2012 |
| WO | WO 2009/149565 A1 | 12/2009 |
| WO | 2011025340 A2 | 3/2011 |
| WO | 2011052964 A2 | 5/2011 |

(Continued)

OTHER PUBLICATIONS

"Evolved Universal Terrestrial Radio Access (E-UTRA); Physical Layer for Relaying Operation," 3GPP TS 36.216 version 10.2.0 Release 10, Universal Mobile Telecommunications System (UMTS); LTE, Apr. 2011, 18 pp.

(Continued)

*Primary Examiner* — Awet Haile
(74) *Attorney, Agent, or Firm* — Slater & Matsil, L.L.P.

(57) ABSTRACT

In accordance with an embodiment, a method of operating a wireless relay device includes establishing a first connection to a base station using a first set of frequency bands, establishing a second connection to a user device using the first set of frequency bands, and establishing a third connection to the base station using a second set of frequency bands.

27 Claims, 8 Drawing Sheets

(56) References Cited

FOREIGN PATENT DOCUMENTS

| WO | WO 2011/160253 A1 | 12/2011 |
| WO | 2012149456 A1 | 11/2012 |

OTHER PUBLICATIONS

"Evolved Universal Terrestrial Radio Access (E-UTRA); Physical Layer Procedures," LTE, 3GPP TS 36,213 version 10.2.0 Release 10, Jun. 2011, 122 pp.

"New Work Item: Improvements to LTE Relay Backhaul," 3GPP TSG-RAN Meeting #52, RP-110743, Ericsson, ST-Ericsson, May 31-Jun. 3, 2011, Slovakia, 5 pp.

International Search Report and Written Opinion of PCT/CN2012/081821, mailing date Jan. 24, 2013, 11 pgs.

Ericsson, "Self backhauling and lower layer relaying," R1-082470, TSG-RAN WG1 #53 bis, Jun. 30-Jul. 4, 2008, 3 pgs.

"Part 11: Wireless LAN Medium Access Control (MAC) and Physical Layer (PHY) Specification: IEEE Standard for Information Technology, Telecommunications and information exchange between systems, Local and metropolitan area networks, Specific requirements," Std 802.11-2007, Nov. 2007, 1,233 pgs.

Extended European Search Report for Application No. 12832899.4; mailed Jul. 29, 2014, 12 pages.

NTT DOCOMO, "Combination of Carrier Aggregation and Relay in Rel-10," 3GPP TSG RAN WG1 Meeting #63bis, R1-110243, Dublin, Ireland, Jan. 17-21, 2011, 4 pages.

\* cited by examiner

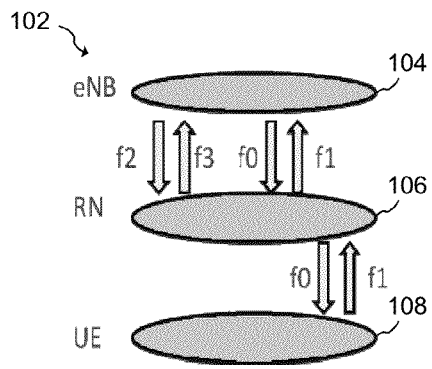
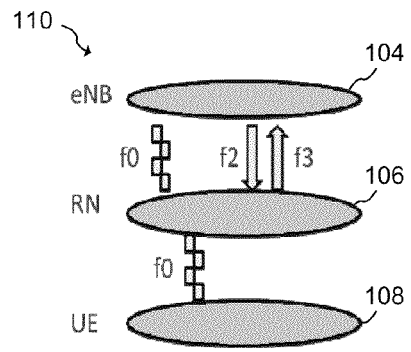
*FIG. 2a*    *FIG. 2b*
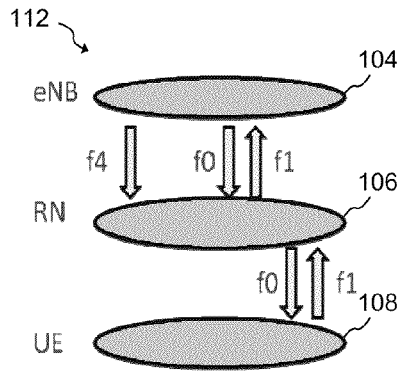
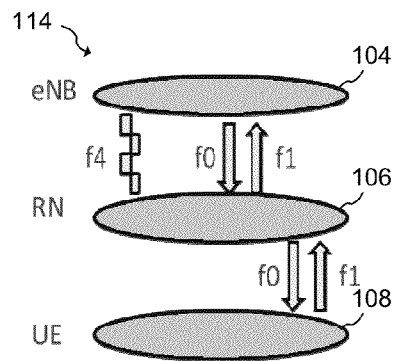
*FIG. 3a*    *FIG. 3b*
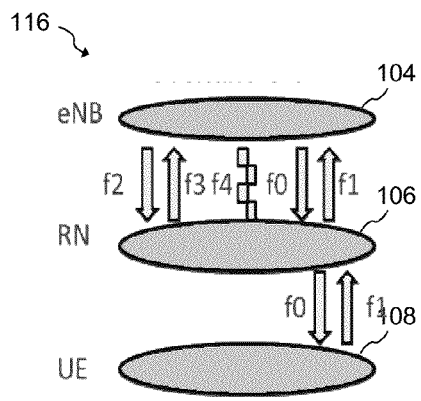
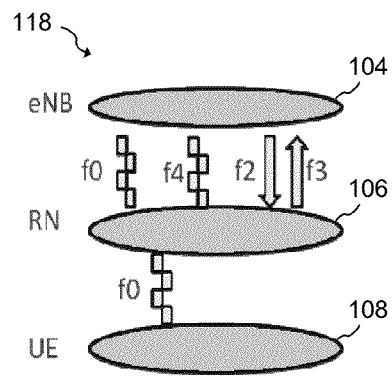
*FIG. 4a*    *FIG. 4b*

HYBRID IN-BAND/OUT-OF-BAND RELAYS

PRIORITY CLAIM TO PROVISIONAL APPLICATION

This patent application claims priority to U.S. Provisional Application No. 61/538,597 filed on Sep. 23, 2011, entitled "Hybrid In-Band/Out-of-Band Relays," which application is hereby incorporated by reference herein in its entirety.

TECHNICAL FIELD

The present invention relates to wireless communication systems, and, in particular embodiments, to Hybrid In-Band/Out-of-Band Relays.

BACKGROUND

Wireless communication systems are widely used to provide voice and data services for multiple users using a variety of access terminals such as cellular telephones, laptop computers and various multimedia devices. Such communications systems may encompass local area networks, such as IEEE 801.11 networks, cellular telephone and/or mobile broadband networks. These communication systems may use a one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

Relay Nodes (RN) are network or terminal nodes that communicate with a base station, such as an enhanced node B (eNB) or user equipment (UE) through a wireless link called a Un link, and may be either in-band (IB) or out-of-band (OOB). A Uu link, on the other hand, refers to the wireless communication link between an eNB (or RN) and a user device such as a UE. For a UE, an RN may appear as an eNB. Relay Nodes (RN) were standardized within LTE Rel-10 as stationary relays, with the primary goal of increasing coverage, as described in 3GPP TS 36.213, v 10.2.0, "Evolved Universal Terrestrial Radio Access (E-UTRA); Physical layer for relaying operation;" and in 3GPP TS 36.216, v 10.2.0, "Evolved Universal Terrestrial Radio Access (E-UTRA); Physical layer procedures," which are incorporated herein by reference in their entirety. However, Carrier Aggregation (CA) is not supported in Rel-10 on the Un link.

In an in-band (IB) Half-Duplex (HD) RN, Un and Uu links operate in the same carrier frequency such that resource partitioning in the time domain is required between the RN's Un and Uu links to prevent RN's transmitter on one link from jamming or interfering RN's receiver on the other link. An IB HD RN is also known as Type 1 RN.

In an out-of-band (OOB) RN, Un and Uu links operate with different carrier frequencies. Here, the frequency separation is sufficient such that no resource partitioning in the time domain is required between a RN's Un and Uu links. For example, a RN's Un and Uu links may be in full-duplex. An OOB RN is also known as Type 1a RN. An in-band (IB) Full-Duplex (FD) RN is an RN where the RN's Un and Uu links operate in the same carrier frequency but do not require resource partitioning due to self-interference cancellation technique used. An IB FD RN is also known as Type 1b RN. Both IB (Half-Duplex) RNs and OOB RNs are supported in LTE Rel-10.

SUMMARY OF THE INVENTION

In accordance with an embodiment, a method of operating a wireless relay device includes establishing a first connection to a base station using a first set of frequency bands, establishing a second connection to a user device using the first set of frequency bands, and establishing a third connection to the base station using a second set of frequency bands.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 2a-b illustrate a first set of embodiment hybrid IB/OOB relay scenarios;

FIGS. 3a-b illustrate a second set of embodiment hybrid IB/OOB relay scenarios;

FIGS. 4a-b illustrate a third set of embodiment hybrid IB/OOB relay scenarios;

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments of the present invention are directed toward relay nodes in LTE systems; however, embodiments of the present invention may be directed toward other types of communication systems.

In an embodiment, a relay or relay node (RN) is a network or terminal device that serves as an eNB to one or more UE by wirelessly connecting to the wireless communications network via a donor eNB (DeNB). The wireless connection between the RN and its DeNB is referred as the backhaul link or Un link. To a UE that is being served by the RN, the RN may appear identical to an eNB. The RN may also perform tasks such as scheduling uplink (UL) and downlink (DL) transmissions to the UE over the access link, which is between the RN and the UE, and is also known as the Uu link.

Figure 1:
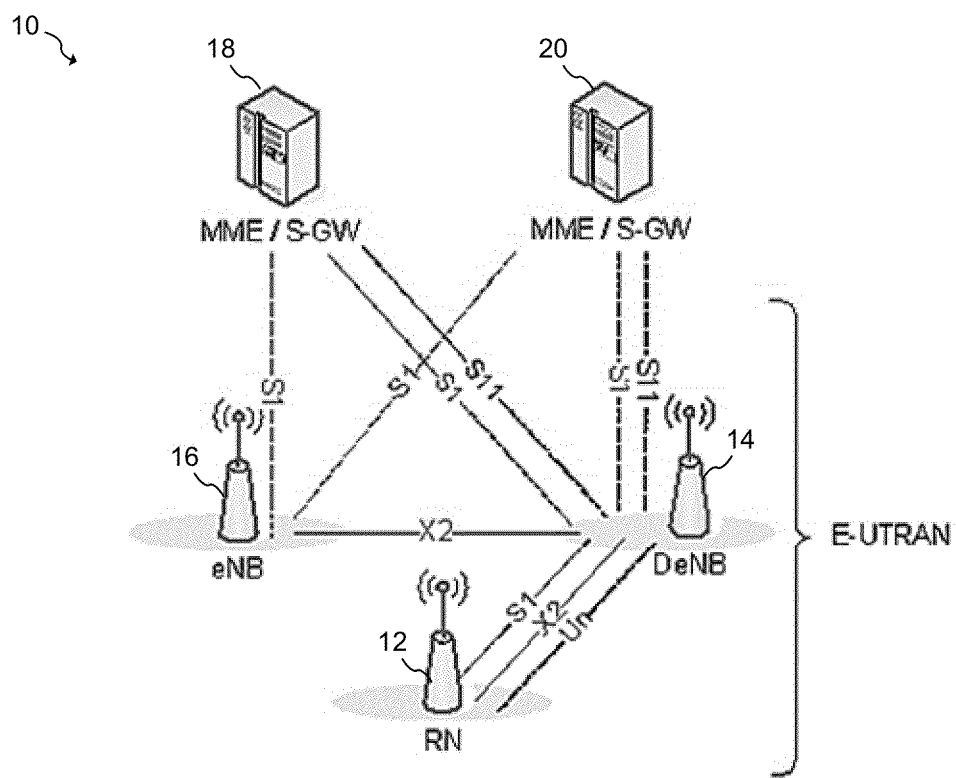
FIG. 1 illustrates an embodiment RN connection to a network.

FIG. 1 illustrates connectivity between RN 12, DeNB 14, eNB 16 and mobile management entities (MMEs) and serving gateways (S-GW) 18 and 20. In an embodiment, RN is coupled to DeNB 14 via an S1 signaling link, an X2 link, and the Un link. DeNB 14 is coupled to MMEs 18 and 20 via S1 and S11 signaling links. eNB 16 may be coupled to MMEs 18 and 20 via S1 signaling links.

There are several types of relays. A Type 1 relay is an In-band (IB) Half-Duplex (HD) RN is an RN in which Un and Uu links operate in the same carrier frequency such that resource partitioning in the time domain is required between RN's Un and Uu links to prevent RN's transmitter on one link from jamming/interfering RN's receiver on the other link. A Type 1a relay Out-of-band (OOB) RN is an RN where RN's Un and Uu links operate in different carrier frequencies and the frequency separation is sufficient such that no resource partitioning in the time domain is required between RN's Un and Uu links, i.e. RN's Un and Uu links can be in full-duplex.

A Type 1b relay, also known as In-band Full-Duplex RN, is an RN in which the Un and Uu links operate in the same carrier frequency but do not require resource partitioning due to self-interference cancellation technique used. Because the signaling aspects of a Type 1a RN is similar to that of a Type 1b RN, Type 1b RNs will be treated as Type 1a RNs hereinafter from a signalling perspective.

In the past, a 3GPP working group has proposed enhancing Un link for relays. In particular, the working group proposed supporting carrier aggregation (CA) on the Un link. This is described in Rel-11, a 3GPP Work Item (WI) RP-110743, which is incorporated by reference in its entirety herein. Since the Un link is perceived as the bottleneck in terms of capacity, adding a carrier on the Un link offers the potential to improve overall system throughput.

In an embodiment, an RN may be operated in a CA mode by having each component carrier (CC) on the RN's Un link operate at a carrier frequency different from that of the carrier on RN's Uu link with sufficient frequency separation. This way, the RN may operate in full-duplex mode using both the Un and the Uu link. In such an embodiment, at least three distinct carrier frequencies are used with sufficient frequency separation. One issue with such an embodiment is that some resources may be left unused on the Uu link when the Un link may not have enough capacity to handle all the traffic required for the RN. In a further embodiment, a combination of IB and OOB relaying (referred to as hybrid IB/OOB relaying) adapts the amount of resources to the Un/Uu traffic demand. In such an embodiment, at least two CCs may be used.

In hybrid IB/OOB relaying embodiments, there are many combinations that may be considered. A few examples of such hybrid IB/OOB relaying embodiments are described herein. It should be appreciated, however, that these embodiments are merely examples of many possible hybrid IB/OOB relaying embodiments.

Embodiment hybrid scenarios may be categorized according to the characteristics of additional carrier used in such embodiments. For example, a Category A system has an additional CC that uses paired DL&UL carrier(s). A paired carrier is used typically for supporting both UL and DL transmission using a FDD frame structure. In a Category B system, an additional CC uses one or more unpaired carrier. In an embodiment, an unpaired carrier supports either DL-only transmissions with a type-1 frame structure (FDD) or both DL and UL transmissions with a type-2 frame structure (TDD). Lastly, a Category C system is a combination of Categories A and B. Here, additional CCs comprise both paired DL & UL carrier(s), and unpaired carrier(s).

For embodiment category A scenarios, the additional carriers are paired UL and DL carriers. Two such embodiment scenarios are illustrated in FIGS. 2a and 2b. FIG. 2a illustrates system 102 having eNB 104, RN 106 and UE 108. RN 106 communicates with eNB 104 via OOB paired carriers f2 and f3 for downlink and uplink, along with a frequency division duplexed (FDD) frame structure being added to the Un link of an otherwise IB HD RN with FDD frame structure. Here, carriers f0 and f1 may be used by RN 108 to communicate with eNB 104 and with UE 108.

Another Category A scenario is illustrated in FIG. 2b, illustrating system 110. In an embodiment, RN 106 communicates with eNB 104 via OOB paired carriers f2 and f3 for downlink and uplink, along with FDD frame structure being added to the Un link of an otherwise IB HD RN with time division duplexed TDD frame structure. Here, carrier f0 may be used by RN 106 to communicate with eNB 104 and with UE 108 using TDD.

For embodiment category B scenarios, the additional carrier are implemented as unpaired carriers. Two such embodiment scenarios are illustrated in FIGS. 3a and 3b. FIG. 3a illustrates system 112 having eNB 104, RN 106 and UE 108. RN 106 communicates with eNB 104 via OOB unpaired carrier f4 with a FDD frame structure in the DL. In an embodiment, f4 is used in addition to a Un link of an otherwise IB HD RN with FDD frame structure using carriers f0 and f1.

Another Category B scenario is illustrated in FIG. 2b, illustrating system 114. In an embodiment, RN 106 communicates with eNB 104 via OOB unpaired carrier f4 having a TDD frame structure in addition to a Un link of an otherwise IB HD RN with FDD frame structure using carriers f0 and f1.

Embodiment Category C scenarios are more complex. In Category C, two types of carriers are added: paired and unpaired. Two such embodiment scenarios are illustrated in FIGS. 4a and 4b. FIG. 4a illustrates system 116 having eNB 104, RN 106 and UE 108. RN 106 communicates with eNB 104 via OOB paired carriers f2 and f3 using FDD FS, and with OOB unpaired carrier f4 being added to the Un link of an otherwise IB HD RN with an FDD frame structure using carriers f0 and f1. FIG. 4b illustrates system 118 in which RN 106 communicates with eNB 104 via OOB paired carriers f2 and f3 using FDD FS and using an OOB unpaired carrier f4 being added to the Un link of an otherwise IB HD RN with a TDD frame structure using carrier f0.

In the existing LTE Rel-10 standard, the following rules are defined:

A UE transmits PUCCH on the primary cell only.
If the UE is configured with more than one serving cell and is not configured for simultaneous PUSCH and PUCCH transmission, then
    if there is no PUSCH on either PCell or SCell, the UL Control Information (UCI)
        consisting of periodic CSI and/or HARQ-ACK is transmitted with a PUCCH in the primary cell (PCell) only;
    else the UCI—consisting of periodic CSI and/or HARQ-ACK is transmitted with a PUSCH, and
        if there is a PUSCH in the PCell, the UCI can only be transmitted with the PUSCH in the PCell, else the UCI can only be transmitted with the PUSCH in the secondary cell (SCell) with the smallest SCell index.

If the UE is configured with more than one serving cell and is configured for simultaneous PUSCH and PUCCH transmission, then If UCI consists "only of HARQ-ACK and/or SR; or only of periodic CSI; or periodic CSI and HARQ-ACK with no PUSCH on either PCell or SCell", the UL Control Information (UCI) is transmitted with a PUCCH in the primary cell (PCell) only;

else the UCI is transmitted on PUCCH and PUSCH, and if there is a PUSCH in the PCell, If UCI consists of HARQ-ACK and periodic CSI, the HARQ-ACK is transmitted on PUCCH, and the periodic CSI is transmitted on PUSCH else If UCI consists of HARQ-ACK and periodic CSI, the HARQ-ACK is transmitted on PUCCH, and the periodic CSI is transmitted on PUSCH of the secondary cell with smallest SCellIndex if at least one secondary cell has PUSCH transmission.

If UCI consists of HARQ-ACK/HARQ-ACK+SR/positive SR and aperiodic CSI, the HARQ-ACK/HARQ-ACK+SR/positive SR is transmitted on PUCCH, and the aperiodic CSI is transmitted on PUSCH.

The above rules may pose some issues for the Un link in some cases. For example, when the IB HD carrier is used as the PCell on RN's Un link, there may not be any valid UL resources (in either PUCCH or PUSCH) for transmitting the UCI for the SCell. This may occur, for example, when the SCell of the Un link operates in full-duplex while the PCell of the Un link operates in half-duplex. Here, the UCI is transmitted on the PCell using the existing rules. However, the PCell on the Un link may not be available for transmissions during some subframes because the same carrier frequency is used for transmissions on the Uu link during those subframes. In some cases, therefore, some of the UCI for the SCell cannot be transmitted. Furthermore, when TDD & FDD frame structures coexist in the Un link, they may not have the corresponding UL subframes matched for transmitting some of the UCI for the SCell operation.

In some embodiments, at least five embodiment solution options may be derived; however, some of these solutions may not be applicable to all scenarios. In an embodiment, Option 1, the OOB carrier is configured as the PCell of RN's Un link. In embodiment Option 2, UCI is transmitted in the UL subframe of the cell using UL subframe resource. In embodiment Option 3, the cell for PUCCH transmission is not limited only to the PCell, but is also allowed on the SCell. In embodiment Option 4, flexible HARQ timing is allowed, and in embodiment Option 5, the Un subframe configuration is configured to alleviate this problem, for example, when one carrier is FDD and the other carrier is TDD. In further embodiments, these options, or subsets of these options may be combined together.

In embodiment Option 1, the OOB carrier is always configured as the PCell. When the OOB carrier is an FDD carrier, there is a Un subframe on the OOB carrier to send the UCI, for both the PCell and the SCell. Therefore, the UCI can always be sent. In Option 1, some signaling changes are made to the SCell for the Un/Uu resource partitioning, as there is currently no existing signaling to communicate the Un/Uu partitioning for the SCell.

In an embodiment, the RN may attach to the DeNB as an OOB RN first during a RN startup procedure. During the attach procedure, the RN indicates its CA capabilities in the UE capabilities. This is where some standard changes are needed to indicate the requirement on subframe partitioning in the configured or configurable SCell(s). There are three sub-options for configuring subframe partitioning in SCell (s): in sub-option 1A, a RRCConnectionReconfiguration message is used to add SCell(s) with subframe partitioning; in sub-option 1B, a RNReconfiguration message is used to add SCell(s) with subframe partitioning; and in sub-option 1C, a combination of sub-options 1A and 1B may be used. For example, in sub-option 1C, an RRCConnectionReconfiguration message may be used to add SCell(s) and an RNReconfiguration message may be used to indicate subframe partitioning for the SCell.

Figure 5A:
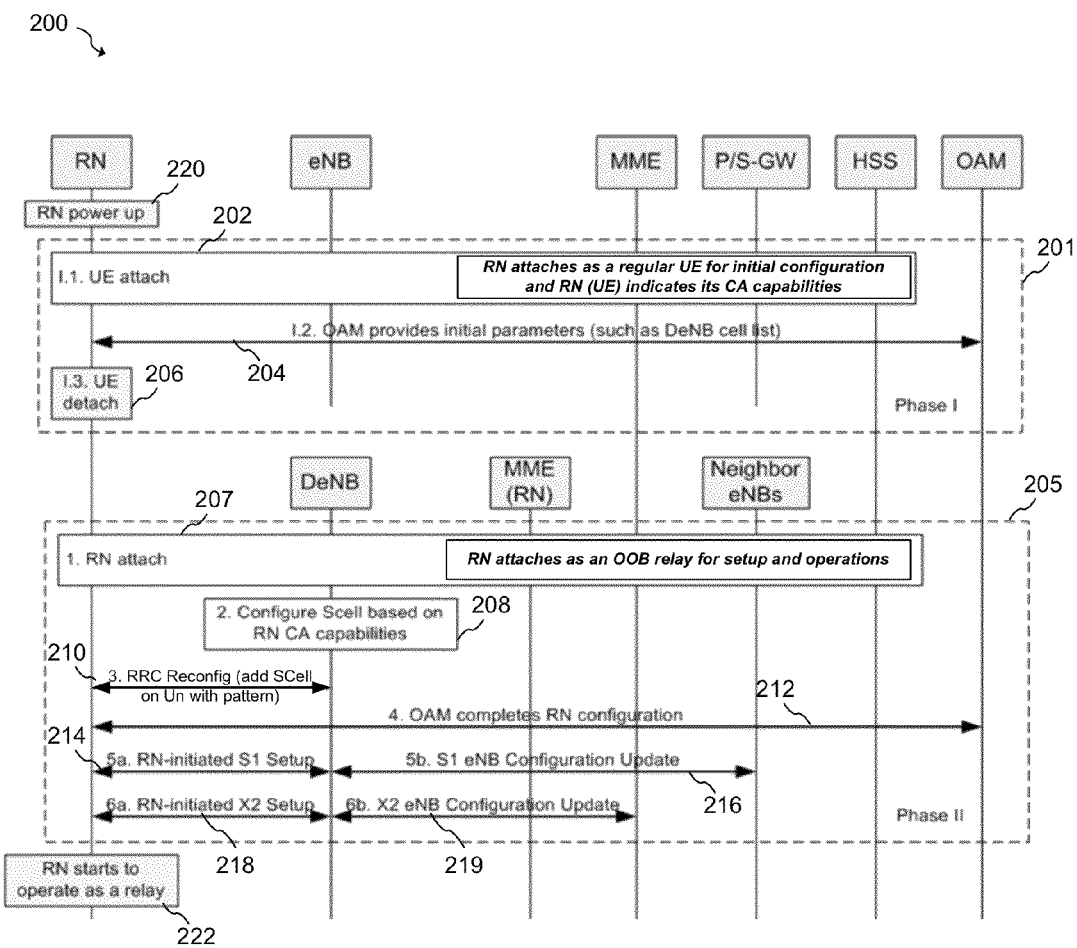
FIGS. 5a-b illustrate embodiment RN attach procedures.
Figure 5B:
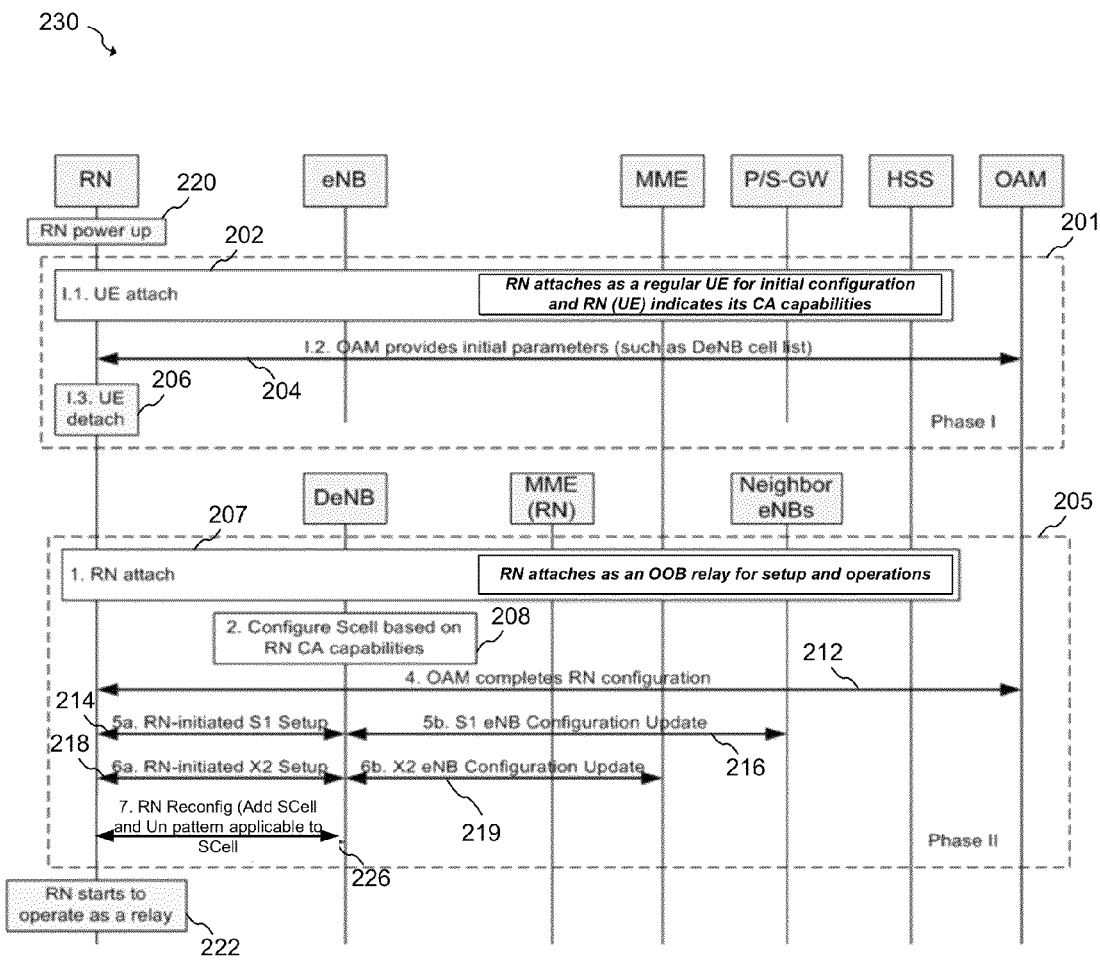

Embodiment RN attach procedure 200 is shown for sub-option 1A in FIG. 5a, and for sub-option 1B in FIG. 5b. Sub-option 1C, which is not illustrated, is basically a combination of sub-options 1A and 1B. In sub-option 1A shown in FIG. 5a, first operation phase 201 is activated after RN power up step 220. First operation phase 201 includes UE attach procedure 202, in which the RN, as a regular UE, attaches to the enhanced packet core (EPC) network. In an embodiment, the EPC network may comprise a mobility management entity (MME), a packet data network gateway/serving gateway (P/S-GW), and a home subscriber server (HSS), for an initial configuration. Here, the RN, acting as a UE, indicates its CA capabilities. In step 204, the operation and maintenance (OAM) entity provides initial parameters to the RN, such as a DeNB cell list. Next, in step 206, the RN performs a UE detach procedure, thereby concluding first operation phase 201.

Next, in second operation phase 205, the RN attaches as an OOB relay for setup and operations in step 207. The DeNB then configures a SCell based on RN CA capabilities in step 208. In step 210, an RRC Reconfiguration is performed between the RN and the DeNB, in which a SCell is added on the Un link with a pattern for partitioning the time resources between the Un and Uu links on the SCell carriers. In step 212, the OAM completes the RN configuration. Next, an RN initiated S1 setup is performed with the DeNB in step 214, and an S1 eNB configuration update is performed between the DeNB and neighboring eNBs in step 216. An RN initiated X2 setup is then performed with the DeNB in step 218, and an S1 eNB configuration update is performed between the DeNB and the MME in step 219. After second phase 205 is complete, the RN begins to operate as a relay in step 222.

FIG. 5b illustrates an RN attach procedure 230 for sub-option 1B. RN attach procedure 230 for sub-option 1B is similar to attach procedure 200 for sub-option 1A, except that instead of performing RRC Reconfiguration step 210, RN Reconfiguration step 226 is performed after X2 setup and reconfiguration update steps 218 and 219.

There are at least two major benefits for Option 1. One advantage is that the PDCCH in the OOB PCell (which is in full-duplex) may be used to perform cross-carrier scheduling for the IB SCell (which is in half-duplex), thereby eliminating R-PDCCH in the IB CCs. A second advantage is that Option 1 may be implemented such that there is no standards impact to the PHY layer.

In embodiment option 2, UCI Transmission is used in the UL Subframe of the Cell with UL Subframe Resource. Here, the IB half-duplex carrier is used as the PCell for the RN's Un link. The additional paired or unpaired carriers may be used as the SCell. In some embodiments, this is achieved by relaxing the 3GPP Rel-10 rules for sending the UCI to allow the UCI to be sent on the SCell as well. Such a relaxation in the specification may entail either a minor standard change or scheduling restriction. Accordingly, Option 2 has at least two sub-options. In Option 2A, the UCI is sent on the PCell if there is a Un subframe on the IB PCell. If there is a Uu subframe on the IB PCell, then the UCI is sent on SCell using the PUSCH. In sub-option 2B, the UCI is always sent on the OOB SCell.

It should be understood that the use of option 2 is not mutually exclusive of option 1, as both options may be jointly used, depending on the scenario. Given the number of possible scenarios, it may be necessary to introduce RRC signaling or pre-configuration, to give the eNB the capability to indicate that the UCI needs, or can, be sent on the SCell PUSCH. Note also that this option can be applied to category scenarios B as well, which may not be addressed as easily with option 1.

Regarding semi-persistent scheduling (SPS) on one carrier, SPS can only be applied on the PCell according to 3GPP Rel-10 CA. This may not be optimal for CA on the Un link. Therefore, it may be advantageous to configure one carrier for SPS. The total traffic data over the Un link may be seen as the aggregation of the traffic data for all the UEs being served by the RN. Therefore, the probability of having zero traffic data to be transmitted over the Un link at a particular moment is very low. Actually, the total traffic data that needs to be transmitted over the Un link may be considered to be a sum of a constant part (or called base-load) and another part that is variable over time. Depending on which carrier is configured as the PCell (IB or OOB), it might be preferable to configure the SCell with SPS. In such a case, the following rules may be applied:

On the carrier configured with SPS, the base-load data traffic is scheduled.

On the carrier not configured with SPS, physical downlink control channel (PDCCH) or R-PDCCH or U-PDCCH or ePDCCH is used to dynamically schedule additional traffic that cannot be accommodated on the carried with SPS.

In an embodiment, some resources are semi-statistically reserved (semi-persistently scheduled), since it may be expected that there is a certain amount of traffic scheduled for the eNB, regardless of the subframe. However, traffic may vary on a subframe-by-subframe basis. For the additional traffic that cannot be scheduled on the SPS carrier, it is dynamically scheduled using the (R/U)-PDCCH channels.

In some embodiments, at least one carrier is configured without SPS for efficient operation. Note also that while described for option 2, this SPS scheduling strategy can be applied to other options as well. Finally, some standard changes may be implemented: namely, the ability to configure a SCell with SPS, and the restriction to have at least one carrier without SPS. In some embodiments, the restriction to have at least one carrier without SPS is optional. Furthermore, SPS may also be used for option 1 in situations where R/U-PDCCH can be avoided.

In an embodiment, Option 3 is a slight variant of Option 2. Using the same assumption that the IB carrier is configured as the PCell, Option 2 entails transmitting the PUCCH on both the PCell and the SCell. Three embodiment subcases are as follows. In Option 3A, the PUCCHs on the PCell and the SCell are independent, and each carrier uses its PUCCH only. In Option 3B, the PUCCH is transmitted on the PCell only if the PCell subframe is a Un subframe. If the PCell subframe is a Uu subframe, the PUCCH is transmitted on the SCell only. In Option 3C, the PUCCH is transmitted only on one cell, which can be either the PCell or the SCell. However, this assignment is configurable. Option 3C may be applicable to simultaneous PUCCH and PUSCH transmission, for example, in cases where the PCell sometimes lacks resources.

In an embodiment, Option 4 uses flexible HARQ timing. When the IB and OOB carriers are of different types (e.g., one is FDD and the other is TDD, or one is FDD and the other is unpaired), the HARQ timing is slightly modified to make sure that there are always resources available to send the UCI.

With respect to Option 4 embodiments, consider that the IB carrier is configured as the PCell and assume that the UCI in PUCCH can only be transmitted in the PCell, as specified for 3GPP Rel-10. Consider, further, for example, the Category B scenario illustrated in FIG. 3a. In some cases, the following problem arises: If RN 106 needs to be scheduled in all the subframes of f4, some SCell UCI may have no corresponding PCell UL subframes due to Un/Uu subframe partitioning. This issue may also arise in other scenarios described herein.

In some embodiments, this issue may be addressed by modifying the HARQ timing so that an ACK is always sent when there is a corresponding Un subframe on the PCell. More specifically, the procedure used is as follows: eNB 104 informs RN 106 of the Un subframe configuration for inband mode, thus both nodes know that there is no UL subframe available for outband DL subframe feedback transmission. The Un UL feedback timing for PDSCH is then adjusted to the nearest available Un UL following subframe as follows:

The Un PDSCH is transmitted in subframe n, such that the nearest available Un UL subframe is the subframe n+x, with x larger than 4.

The nearest available Un UL subframe depends on the Un subframe configuration.

The UL feedback in one subframe consists of feedback from inband DL subframe n−4, outband subframe n−4, and outband n−x subframe, with x larger than 4.

Figure 6:
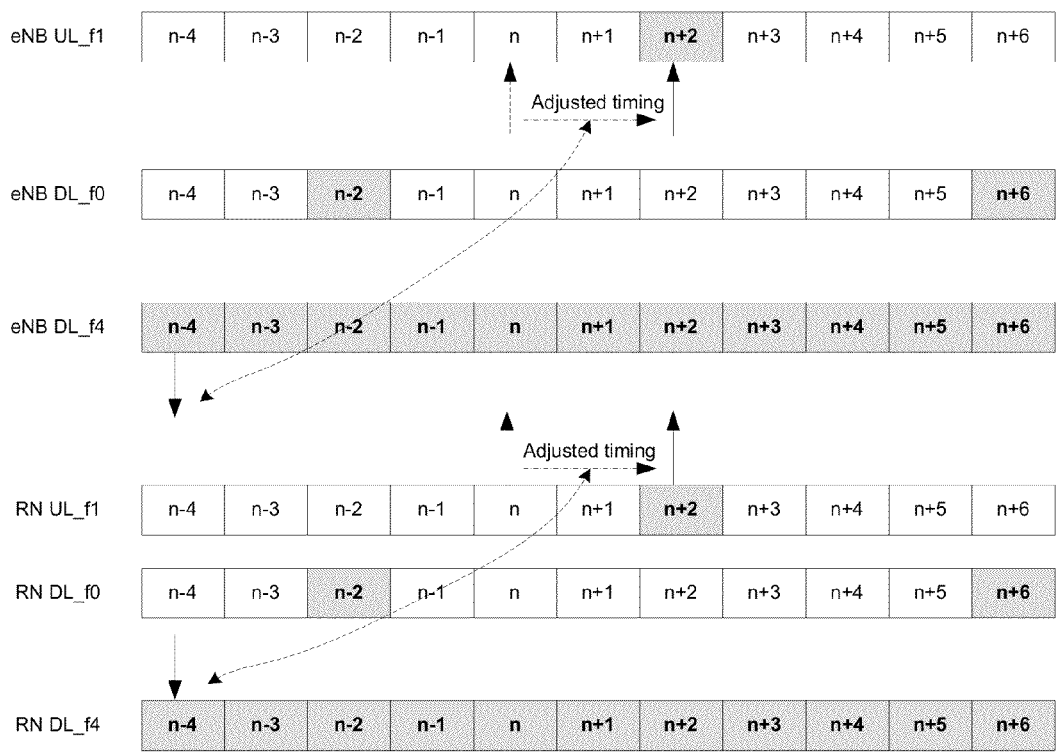
FIG. 6 illustrates an embodiment modified timing.

In an embodiment, the UL feedback in subframe n is ordered in sequence e.g., Inband_n−4→Outband_n−4→Outband_n−x or any other combination thereof. The rules are graphically illustrated in FIG. 6 with respect to the Category B scenario illustrated in FIG. 3a. In this example only UL subframe n+2 and DL subframe n−2 and n+6 are configured for Un on the IB carrier (f0, f1), and the other subframes are Uu subframes. Thus, for carrier f4, for example DL subframe n−4, there is no available corresponding PCell subframe used for f4 UCI transmission according to LTE Rel-8~Rel-10 HARQ-ACK timing. Therefore, the UCI is sent on the first following Un subframe on the PCell (n+2). It should be appreciated that in alternative embodiments, other timing scenarios may be implemented.

More specifically, assuming that nk is one of the configured Un DL subframes {na, . . . nj, nk, na . . . nj, nk . . . }, the ACK/NACK timing rule can be written as follows: A window is defined such that the window length is a variable L, where L>=4. For any unpaired carrier DL subframe nk, its UL ACK/NACK feedback subframe for PUCCH is sent according to the following rule:

L=4
   While (nk+L is not a configured Un UL subframe)
   L++
   End

Figure 7:
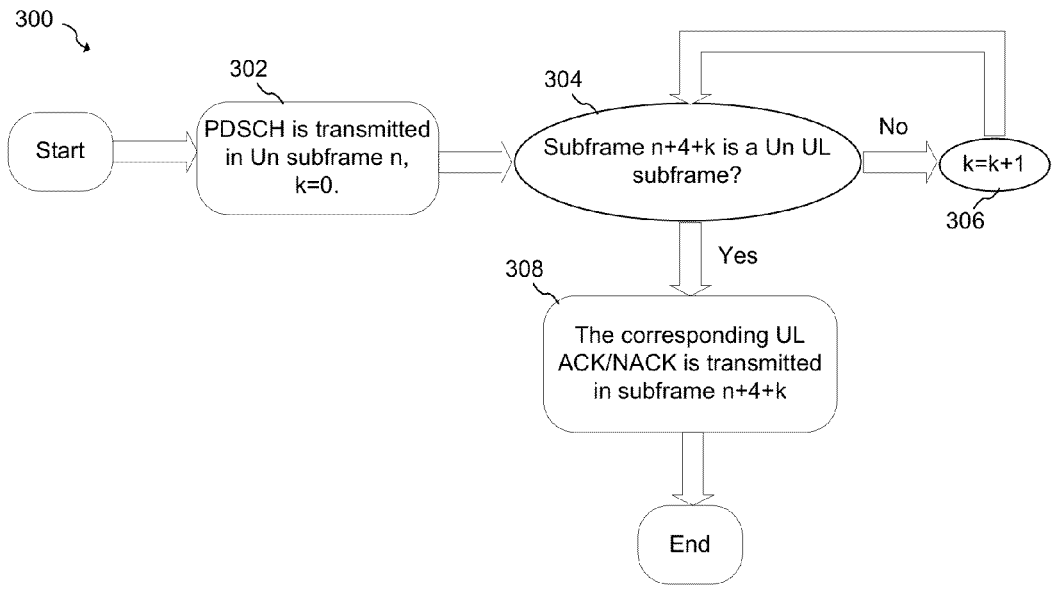
FIG. 7 illustrates an embodiment HARQ timing flowchart.

FIG. 7 illustrates flow chart 300 of an embodiment flexible HARQ timing. In step 302, the PDSCH is transmitted in Un subframe n, where k=0. In step 304, it is determined whether subframe n+4+k is a Un UL subframe. If subframe n+4+k is a Un UL subframe, a corresponding UL ACK/NACK is transmitted in subframe n+4+k in step 308. If not, k is incremented in step 306.

For the codeword mapping rules per carrier/subframe, similar rules as for 3GPP Rel-10 can be used, as shown in Table 1. In Table 1, subframes m and n may be any value from 0 to 9. In an embodiment, HARQ-ACK(j), j belongs to one or some of {0, 1, 2, 3, 4, 5} that are transmitted in subframe n+4, and the corresponding DL subframes are n and/or m, m>=n.

TABLE 1

Mapping Rules.

| | HARQ-ACK(j) | | | | | |
|---|---|---|---|---|---|---|
| | HARQ-ACK(0) | HARQ-ACK(1) | HARQ-ACK(2) | HARQ-ACK(3) | HARQ-ACK(4) | HARQ-ACK(5) |
| Option 1 | TB1 Primary cell | TB2 Primary cell | TB3 Secondary cell1 | TB4 Secondary cell1 | TB5 Secondary cell1 | NA |
| Option 2 | TB1 Primary cell | TB2 Primary cell | TB3 Secondary cell1 | TB4 Secondary cell1 | TB5 Secondary cell1 | TB6 Secondary cell1 |
| Subframe # | n | n | m | m | m | n |

In embodiment Option 5, constraints may be placed on the Un subframe configuration. In some cases, notably when one of the carriers is FDD and the other TDD, constraints are placed on the Un subframe allocation so that the Un allocations on both carriers "match." In an embodiment, for the Category B scenario illustrated in FIG. 3b, the PCell is the IB carrier and is FDD on carriers (f0, f1). The SCell is OOB TDD carrier f4. In this embodiment, if f4 occupies a frequency close to (f0, f1), there may be some significant adjacent channel interference, so additional restrictions may be required.

In an embodiment, a matching rule is used: for every UCI of the SCell to be transmitted in the PCell (f1), there is an available Un UL subframe on f4. This rule alleviates the UCI problem, since by design, every time the TDD carrier needs to transmit UCI, there is a corresponding UL Un subframe on the FDD carrier.

In LTE TDD, different UL/DL configurations, with corresponding configuration indices, are defined for different DL & UL subframe numbers, as shown in Table 2. In Table 2, D denotes a DL subframe, U denotes a UL subframe and S denotes a special subframe that includes three regions: DwPTS, guard period and UpPTS.

TABLE 2

Uplink-downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 8:
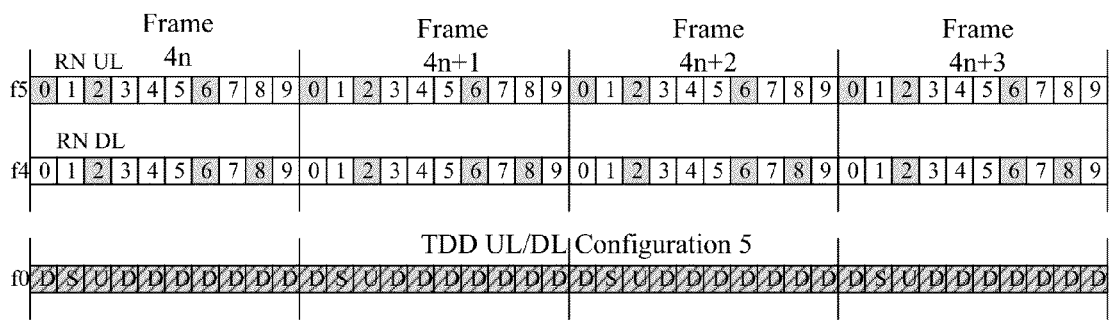
FIG. 8 illustrates an example of an embodiment matching rule.

FIG. 8 illustrates an application of the above rule for TDD UL/DL Configuration 5. Here, the only UL subframe is subframe 2, as designated by the "U" in subframe 2 of f0. As such, UL subframe 2 is configured as a UL subframe all the time. This can be ensured by using the following bitmap allocation for the FDD carrier: "1a1b1c1d", where a, b, c, d, can either be 0 or 1. For example, an FDD Un subframe configuration including even subframes with 10 ms periodicity, except for subframes 4 and 8 are required to align with the TDD 10 ms periodicity when the TDD UL subframe is even subframe. In an embodiment, possible bitmap allocations for the FDD Un subframes may include: 10101010, 10101011, 10101110, 10101111, 10111010, 10111011, 10111110, 10111111, 11101010, 11101011, 11101110, 11101111, 11111010, 11111011, 11111110, 11111111. Alternatively, other subframes besides 4 and 8 may be chosen to be to exception subframes, and other bitmap allocations may be used. In an embodiment, PUCCH is only transmitted on the primary cell. Thus TDD UL HARQ-ACK in PUCCH occurrence aligns with the FDD inband Un UL subframe. Otherwise there may be some UL HARQ-ACK loss for the TDD CC. In FIG. 8, the configured Un subframes are shown as shaded subframes.

In LTE, an 8 bit bitmap from RRC signaling for FDD defines the DL subframe configuration for an eNB-to-RN transmission. For example, these are subframes in which the eNB may indicate downlink assignments for the RN. The radio frame in which the pattern starts (i.e. the radio frame in which the first bit of the bitmap configuration corresponds to subframe number 0) occurs when SFN mod 4=0. Note the FDD Un subframe configuration excludes DL subframe 0, 4, 5 and 9 in some embodiments. Thus, bitmap allocation 1a1b1c1d with respect to FIG. 8 corresponds to DL subframes 2, 6 and 8 in frame 4n–4n+3. In an embodiment, the Un UL subframes are achieved according to Un DL subframe configuration. For example, once DL subframe n is configured, the corresponding n+4 UL subframes are also configured as UL Un subframes for the FDD frame structure.

In some embodiments, TDD configuration 5 may be adequately supported with this solution without putting too many restrictions on the Un subframe configuration for the PCell. However, for practical deployments, this may not be problematic, since the DL-heavy configurations (such as configuration 5) are useful in increasing throughput on the backhaul. Configuration 2 may be supported as well, but requires that all possible Un subframes are configured as Un subframe on the IB carrier in some embodiments.

In an embodiment, a different frame structure type is used for aggregated serving cells. The frame structure type is signaled for certain aggregated serving cells. In some embodiments, the frame structure may be LTE frame structure type 1 or type 2. The frame structure configuration may also be indicated by a higher signaling. PUCCH may include the feedback that corresponds to the subframes from different carriers, for example, as explained in option 4 hereinabove. In some embodiments, the subframe number corresponding to the same PUCCH resource from different carriers may be different. PUCCH feedback in one subframe of carrier-a includes the number of m subframes feedback from carrier-a, and number of n subframes feedback from carrier-c, where m and n are integer, and may be different. In various embodiments, serving cells may belong to the same eNB or to a different eNB.

In a further embodiment relating to SPS on SCELL XOR PCELL, a method for scheduling data transmission includes assigning semi-static resources on a first carrier. This assignment may be used for example, with a relatively stable data, base-load. In some embodiments, semi-static resources can only be allocated on the first carrier. In a further embodiment, the method includes assigning dynamic resources on second carriers, for example for variable data.

In an embodiment, a method for transmitting resource grant assignment includes assigning semi-statically resources assignment on a first carrier, and assigning dynamic resources on a second carrier. In some embodiments, resource assignment on a first carrier uses RRC signaling, and resource assignment on second carrier uses carrier on PDCCH/R-PD-CCH.

In an embodiment, a relay with carrier aggregation includes the PCell of the Un link operating in a first carrier frequency in full-duplex mode, and the SCell of the Un link and the Uu link of the relay operating in a second carrier frequency in half-duplex mode. In some embodiments, the DL scheduling information for the SCell of the Un link is received from the PCell of the Un link. Furthermore, the UL scheduling information for the SCell of the Un link may be received from the PCell of the Un link.

In an embodiment, Un UL feedback timing for PDSCH is adjusted to the nearest next available Un UL subframe. In an embodiment, a HARQ number of a process is calculated as follows:

$$N_{HARQ} = \max_{i=0...N} \sum_{j=1}^{i+8} \begin{cases} 1 & Unsubframe \\ 0 & Unsubframe, \end{cases}$$

where $N_{HARQ}$ is the Un subframe configuration period of 10 ms or 40 ms. The above equation may be used to decide a HARQ process number with a window length of 8 ms within 10 ms or 40 ms. Un PDSCH is transmitted in subframe n, and the nearest available Un UL subframe is the subframe n+x, x is larger than 4. In an embodiment, the nearest available Un UL subframe depends on the Un subframe configuration. The UL feedback in one subframe has feedback from inband DL subframe n−4, outband subframe n−4, and outband n−x subframe, x is larger than 4. In some embodiments, the UL feedback in subframe n is ordered in sequence e.g. Inband_n−4→Outband_n−4→Outband_n−x or any other combination of them. In some cases, these embodiments may be used to implement, for example, option 4 (HARQ timing) described above.

In an embodiment, a method for aggregating a first CC with a first frame structure and a second CC with a second frame structure over the Un link includes finding a first duplexing pattern for the first CC, finding a second duplexing pattern for the second CC, and matching the first pattern and the second pattern. In some embodiments, matching includes providing a resource on a first CC for UCI transmission for a second CC (in addition to UCI transmission for the first CC). In some cases, these methods may be used to implement, for example, option 5 described above.

In an embodiment, PUCCH is transmitted in only one cell and can be transmitted in the SCell. The cell for PUCCH transmission may be configured by RRC signaling or OAM. This method may be used for Option 3 described above.

Figure 9:
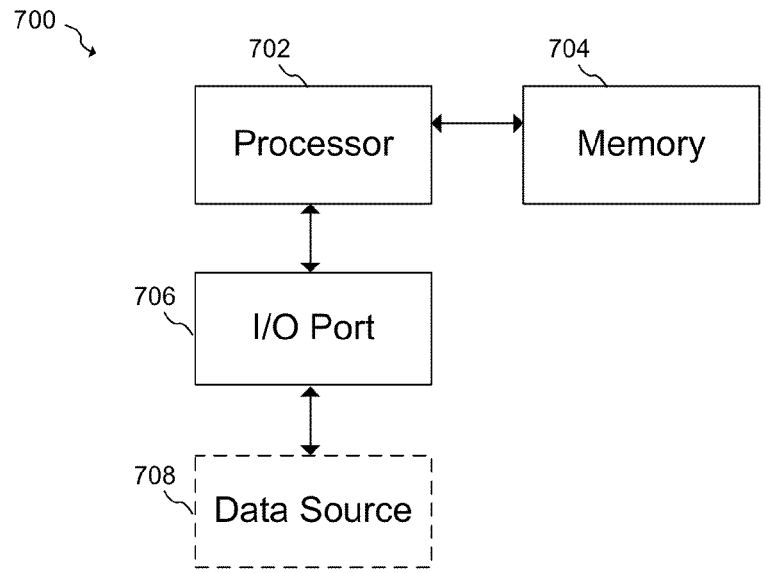
FIG. 9 illustrates a processing system that may be utilized to implement methods of the present invention.

FIG. 9 illustrates processing system 700 that can be utilized to implement methods of the present invention. In this case, the main processing is performed in processor 702, which can be a microprocessor, digital signal processor or any other appropriate processing device. Program code (e.g., the code implementing the algorithms disclosed above) and data can be stored in memory 704. The memory can be local memory such as DRAM or mass storage such as a hard drive, optical drive or other storage (which may be local or remote). While memory 704 is illustrated functionally with a single block, it is understood that one or more hardware blocks can be used to implement this function.

In one embodiment, processor 702 can be used to implement various ones (or all) of the functions discussed above. For example, the processor can serve as a specific functional unit at different times to implement the subtasks involved in performing the techniques of the present invention. Alternatively, different hardware blocks (e.g., the same as or different than the processor) can be used to perform different functions. In other embodiments, some subtasks are performed by the processor while others are performed using a separate circuitry.

FIG. 9 also illustrates I/O port 706, which can be used to provide data to and from processor 702. Data source 708 (the destination is not explicitly shown) is illustrated in dashed lines to indicate that it is not a necessary part of the system. For example, the source can be linked to the system by a network such as the Internet or by local interfaces (e.g., a USB or LAN interface).

Figure 10A:
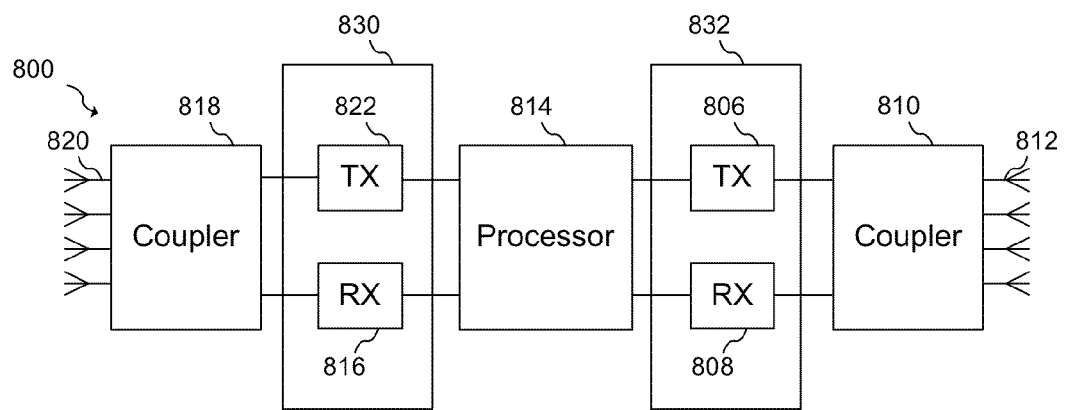
FIGS. 10a-b illustrate embodiment RNs.

A block diagram of embodiment relay node (RN) 800 is illustrated in FIG. 10a. Relay node 800 has donor antenna 820, which transmits to and from the eNB and is coupled to coupler 818 and transceiver 830 that has transmitter 822 and receiver 816. Service antenna 812, which transmits to and receives signals from user equipment, is coupled to coupler 810 and transceiver 832 that has transmitter 806 and receiver 808. RN processor 814, which is coupled to both the donor and UE signal paths, controls the operation of relay node and implements embodiment algorithms described herein.

Embodiments of the present invention may be implemented within RN 800. For example, transmitters 806 and 822 and receivers 808 and 816 may be used to transmit the various carriers and data described in the embodiments above. Furthermore, some of the algorithms described in embodiments above may be executed by RN processor 814.

Without using carrier aggregation (CA) on the Un link, an OOB relay node may have two transceivers, one for communicating with the donor, the other for communicating with the UEs. However, for an in-band relay node (without CA), since the Un and Uu links are time division multiplexed, the same transceiver structure may be time-shared between Un and Uu links, to save hardware costs. In one such embodiment, the in-band relay uses a pair of carriers and FDD frame structure. As such, when the single transceiver is switched between serving the Un link and serving the Uu link, the center frequencies of the transmitter and the receiver may be switched. In another single transceiver embodiment, the in-band relay uses a single carrier and TDD frame structure. As such, the transmitter and the receiver of the single transceiver share the same center frequency, i.e. there is no need to re-tune the local oscillator. In further embodiments, using different transceivers to serve the Un and Uu links of an in-band relay may be advantageous, for example, when a directional antenna is used on the Un link to enhance the channel quality of the backhaul link while the service antenna is omni-directional. In some embodiments that combine an in-band relay Un link with additional OOB carrier using carrier aggregation, an assumption may be made that the OOB carrier does not generate interference with the in-band carriers. As such, the OOB carrier may continue to operate in the full duplex mode. Here, one transceiver may be used on the OOB carrier and another transceiver may be used on the in-band carrier but time-shared between the Un and Uu links.

Figure 10B:
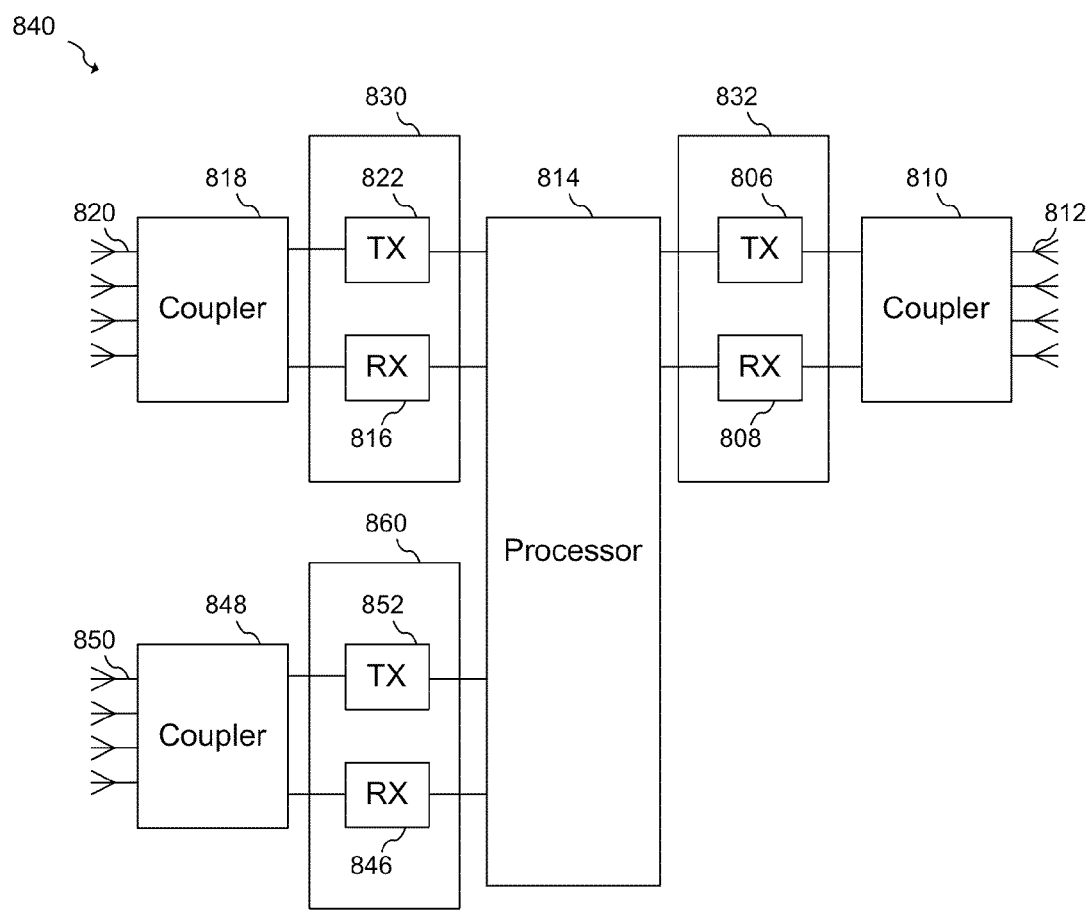

FIG. 10b illustrates RN 840 according to a further embodiment of the present invention. RN 840 has additional transceiver 860 having transmitter 852, receiver 846, coupler 848 and antennas 850. In some embodiments, antennas 820 may be shared with transceiver 860 and antennas 850 may be omitted. In further embodiments, more transceivers may be coupled to processor 814 and be assigned to any link according to the particular embodiment and its specifications.

It should be appreciated that in some embodiments, one more transceivers may be used to implement the respective communications links. In other embodiments, a single transceiver may be used to implement a plurality of communication links. For example, in one embodiment if there are only two carriers, one for inband and one for outband, one transceiver for both inband and outband carriers, or one transceiver may be used for the inband carrier and another transceiver be used for the outband carrier. If, for example, there are three carriers (A, B, C) for inband and outband, in one embodiment, one transceiver may be used for carriers A, B and C. In other embodiments, one transceiver may be used for carrier A and another single transceiver be used for carriers B, and C, or other combinations, thereof. In another embodiment, three transceivers may be used, where a single transceiver is assigned to each individual carrier for a total of three transceivers.

In an embodiment, a wireless relay device includes a first transceiver, a second transceiver, and a processor coupled to the first transceiver and second transceivers. The processor is configured to establish a first connection to a base station using a first set of frequency bands via the first transceiver, establish a second connection to a user device using the first set of frequency bands via the second transceiver, and establish a third connection to the base station using a second set of frequency bands via the first transceiver. In some embodiments, the wireless relay device also has a third transceiver coupled to the processor. Here, the processor may be configured to establish the third connection to the base station using the second set of frequency bands via the first transceiver or via the third transceiver.

In accordance with an embodiment, a method of operating a wireless relay device include establishing a first connection to a base station using a first set of frequency bands, establishing a second connection to a user device using the first set of frequency bands, and establishing a third connection to the base station using a second set of frequency bands. Some embodiments, operating the relay device comprises operating the relay device on a Long Term Evolution (LTE) network. For example, the wireless relay device may be a relay node, the base station may be an eNB and the user device may be a UE.

In some embodiments, the first set of frequency bands comprise in-band carriers, and the second set of frequency bands comprise out of band carriers. The first set of frequency bands include a first pair of frequency division duplex (FDD) frequency bands, and the second set of frequency bands may include a second pair of FDD frequency bands, such that the second set of frequency bands are different from the first set of frequency bands. Moreover, the first set of frequency bands are time division multiplexed between the first connection and the second connection.

In an embodiment, the second set of frequency bands further comprise a TDD frequency band. The first set of frequency bands include a time division duplex (TDD) frequency band, and the second set of frequency bands include a pair of frequency division duplex (FDD) frequency bands, such that the second set of frequency bands being different from the first set of frequency bands.

In an embodiment, the first set of frequency bands include an in-band carrier, and the second set of frequency bands comprise out of band carriers. The TDD frequency band is time division multiplexed between the first and second connections. In some embodiments, the second set of frequency bands further includes a TDD frequency band.

In an embodiment, the first set of frequency bands include a pair of frequency division duplex (FDD) frequency bands, and the second set of frequency bands include a single frequency band, such that the second set of frequency bands being different from the first set of frequency bands. In some embodiments, the single frequency band is used to transmit downlink data using a FDD downlink frame structure. In some other embodiments, the single frequency band transmits downlink data using a TDD downlink subframe and transmits uplink data using a TDD uplink subframe. Moreover, the TDD downlink subframe and the TDD uplink subframe may be time division duplexed on the single frequency band according to a TDD frame structure.

In accordance with a further embodiment, a method of operating a relay node (RN) includes establishing a primary cell (PCell) connection with an eNB using an out of band (OOB) carrier. After establishing the PCell connection with the eNB, a secondary cell connection (SCell) is established with the eNB using an in-band (IB) carrier. Furthermore, after establishing the SCell connection with the eNB, a connection with a user equipment (UE) is established using the in-band carrier. The SCell connection with the eNB and the connection with the UE are time division duplexed on the in-band carrier.

In an embodiment, the method further includes configuring an uplink of the PCell connection to transmit uplink control information for both the PCell and the SCell. In some embodiments, establishing the SCell connection includes using an RRCConnectionReconfiguration message to establish the SCell connection, and performing subframe partitioning on the in-band carrier. In an embodiment, the subframe partitioning is used for time division duplexing between the SCell connection with the eNB and the connection with the UE. Subframe partitioning may also include adding an information element (IE) with subframe partitioning.

In an embodiment, establishing the SCell connection includes using an RNReconfiguration message to establish the SCell connection with subframe partitioning, wherein the subframe partitioning is used for time division duplexing between the SCell connection with the eNB and the connection with the UE. In a further embodiment, establishing the SCell connection includes using an RRCConnectionReconfiguration message to establish the SCell connection, and using an RNReconfiguration message to indicate subframe partitioning for the SCell. In such embodiments, the subframe partitioning may be used for time division duplexing between the SCell connection with the eNB and the connection with the UE.

In accordance with an embodiment, method of operating a relay node (RN) includes establishing a primary cell (PCell) connection with an eNB using an in-band (IB) carrier. After establishing the PCell connection, a secondary cell (SCell) connection with the eNB using an out of band (OOB) carrier is established. The method further includes transmitting uplink control information (UCI) on the IB carrier if an uplink resource is available on the IB carrier, and transmitting UCI on the OOB carrier if the uplink resource is not available on the IB carrier.

In an embodiment, the method further includes establishing a connection to a user equipment (UE) using the IB carrier, where the PCell connection with the eNB and the connection with the UE are time division duplexed on the in-band carrier. In some embodiments, the IB carrier includes a pair of frequency bands using a frequency division duplex frame structure. However, in other embodiments, IB carrier may comprise a single frequency band using a time division duplex frame structure.

In accordance with a further embodiment, a method of operating a relay node (RN), the method includes establishing a primary cell (PCell) connection with an eNB using an in band (IB) carrier. After establishing the PCell connection, a secondary cell (SCell) connection with the eNB using an out of band (OOB) carrier is established. The method further includes transmitting physical uplink control channels (PUCCHs) on the PCell and/or the SCell.

In an embodiment, transmitting the PUCCHs on the PCell and the SCell comprises transmitting the PUCCHs independently on the PCell and the SCell. In some embodiments, transmitting physical uplink control channels (PUCCHs) on the PCell and the SCell may include giving precedence to transmitting on the PCell if a PCell is available for transmission.

In accordance with an embodiment, a method of operating a relay node (RN) includes establishing a primary cell (PCell) connection with an eNB using an in band (IB) carrier. After establishing the PCell connection, a secondary cell (SCell) connection with the eNB using an out of band (OOB) carrier is established. The method further includes configuring the RN to transmit physical uplink control channels (PUCCHs) either on the PCell or on the SCell.

In accordance with a further embodiment, a method of operating a relay node (RN) includes establishing a primary cell (PCell) connection with an eNB using an in band (IB) carrier. After establishing the PCell connection, a secondary cell (SCell) connection with the eNB using an out of band (OOB) carrier is established. The method may further include adjusting uplink feedback timing for a physical downlink shared channel (PDSCH) to a next nearest available PCell uplink subframe that satisfies a minimum time delay requirement. In some embodiments, adjusting includes determining a first PCell subframe on which the PDSCH is transmitted, and counting a first number of subframes after the first PCell subframe. If the first number of subframes after the first PCell subframe is the nearest available PCell uplink subframe, then the uplink timing is set to the first number of subframes after the first PCell subframe on which the PDSCH is transmitted. If the first number of subframes after the first PCell subframe is not a PCell uplink subframe, then a further number of subframes is incremented until a PCell uplink subframe is reached and set the uplink timing to the first number plus the further number of subframes after the first PCell subframe on which the PDSCH is transmitted.

In an embodiment, the first number of subframes is four subframes. In some embodiments, the method further includes ordering the UL feedback in subframe n in sequence as inband_subframe n−4, outband_subframe n−4, outband_subframe n−x or any other combination of them. In embodiments, the method further includes transmitting uplink feedback corresponding to inband DL subframe n−4, outband subframe n−4, and outband n−x subframe, where x is larger than 4.

In an embodiment, the RN is configured to operate on a Long Term Evolution (LTE) system, and the uplink feedback timing comprises a Hybrid Automatic Repeat Request (HARQ) timing. In some embodiments, the method further includes transmitting uplink ACK/NACK feedback on the nearest available PCell uplink subframe. The method may also include transmitting uplink feedback on the nearest available PCell uplink subframe.

In an embodiment, a method of operating a relay node (RN), the method includes establishing a primary cell (PCell) connection with an eNB using an in band (IB) carrier. After establishing the PCell connection, a secondary cell (SCell) connection with the eNB using an out of band (OOB) carrier is established. The method also includes configuring an uplink subframe on the IB carrier and an uplink subframe on the OOB carrier to coincide with each other, and transmitting UCI on the IB carrier during an uplink subframe if the OOB carrier is designated to send data.

In an embodiment, the IB carrier includes a pair of frequency division duplex carriers, and the OOB carrier comprises a time division duplex carrier. The method may further include establishing a connection to a user equipment (UE) using the IB carrier. In an embodiment, a frame includes j subframes, and the method further includes scheduling the uplink subframe on the IB carrier and the uplink subframe on the OOB carrier to occur on an mth subframe of the j subframes. In an example embodiment, j=10, and m=2. In another embodiment, j=10 and m=7. Alternatively, other values for j and m may be used.

In an embodiment, the method further includes transmitting a physical uplink control channel (PUCCH) only on the PCell.

In accordance with another embodiment, a method for operating a relay node (RN) in a wireless system includes establishing links to a base station using a first component carrier (CC) and a second CC, and aggregating the first CC with a first frame structure and a second CC with a second frame structure over the links to the base station. In an embodiment, aggregating includes determining a first duplexing pattern for the first CC and a second duplexing pattern for the second CC, and matching the first pattern and the second pattern. The method further includes establishing links to a user device using the first CC, such that the links to the user equipment and the links to the base station are time multiplexed on the first CC using the first duplexing pattern.

In an embodiment, matching includes determining when an uplink subframe of the first CC coincides with an uplink subframe of the second CC. Moreover, matching may include providing a resource on a first CC for UCI transmission for the second CC in addition to a UCI transmission for the first CC.

In an embodiment, a method for scheduling data transmission includes assigning semi-static resources on a first carrier and assigning dynamic resources on a second carrier. In an embodiment, the semi-static resources can only be allocated on the first carrier. These semi-static resources may include, for example, a relatively stable data, base-load, and the dynamic resources may include variable data. In some embodiments, assigning semi-static resources includes using RRC signaling.

In accordance with a further embodiment, a method for transmitting a resource grant assignment includes assigning semi-statically resources on a first carrier, and assigning dynamic resources on a second carrier. Assigning semi-statically resources on a first carrier may include using RRC signaling.

In accordance with an embodiment, a non-transitory computer readable medium has an executable program stored thereon. The program instructs a processor of a wireless relay device to perform the steps of establishing a first connection to a base station using a first set of frequency bands, establishing a second connection to a user device using the first set of frequency bands, and establishing a third connection to the base station using a second set of frequency bands.

In accordance with an embodiment, a wireless relay device includes a first transceiver, a second transceiver, and a processor coupled to the first transceiver and to the second transceiver. The processor is configured to establish a first connection to a base station using a first set of frequency bands via the first transceiver, and establish a second connection to a user device using the first set of frequency bands via the second transceiver. In an embodiment, the processor is further configured to establish a third connection to the base station using a second set of frequency bands via the first transceiver.

In some embodiments, the wireless relay device further includes a third transceiver coupled to the processor, such that the processor is further configured to establish the third connection to the base station using the second set of frequency bands via the third transceiver.

In accordance with a further embodiment, a non-transitory computer readable medium has an executable program stored thereon. The program instructs a processor of a wireless relay device to perform the steps of establishing a primary cell (PCell) connection with an eNB using an out of band (OOB) carrier, establishing a secondary cell (SCell) connection with the eNB using an in-band (IB) carrier after establishing the PCell connection with the eNB, and establishing a connection with a user equipment (UE) using the in-band carrier after establishing the SCell connection with the eNB. The SCell connection with the eNB and the connection with the UE are time division duplexed on the in-band carrier.

In accordance with a further embodiment, a wireless relay device includes a first transceiver, a second transceiver, and a processor coupled to the first transceiver and second transceivers. The processor is configured to establish a primary cell (PCell) connection with an eNB using an out of band (OOB) carrier via the first transceiver, establish a secondary cell (SCell) connection with the eNB using an in-band (IB) carrier after the PCell connection with the eNB is established via the first or the second transceiver, and establish a connection with a user equipment (UE) using the in-band carrier via the second transceiver after the SCell connection with the eNB is established. The SCell connection with the eNB and the connection with the UE are time division duplexed on the in-band carrier.

In accordance with an embodiment, a non-transitory computer readable medium has an executable program stored thereon. The program instructs a processor of a wireless relay device to perform the steps of establishing a primary cell (PCell) connection with an eNB using an in-band (IB) carrier, establishing a secondary cell (SCell) connection with the eNB using an out of band (OOB) carrier after establishing the PCell connection, transmitting uplink control information (UCI) on the IB carrier if an uplink resource is available on the IB carrier, transmitting UCI on the OOB carrier if the uplink resource is not available on the IB carrier.

In accordance with and embodiment, a wireless relay device includes a first transceiver, a second transceiver; and a processor coupled to the first transceiver and the second transceiver. The processor is configured to establish a primary cell (PCell) connection with an eNB using an in-band (IB) carrier via the first transceiver, establish a secondary cell (SCell) connection with the eNB using an out of band (OOB) carrier via the first transceiver after the PCell connection is established, transmit uplink control information (UCI) on the IB carrier if an uplink resource is available on the IB carrier, and transmit UCI on the OOB carrier if the uplink resource is not available on the IB carrier.

In accordance with an embodiment, a non-transitory computer readable medium has an executable program stored thereon. The program instructs a processor of a wireless relay device to perform the steps of establishing a primary cell (PCell) connection with an eNB using an in band (IB) carrier, establishing a secondary cell (SCell) connection with the eNB using an out of band (OOB) carrier after establishing the PCell connection, and transmitting physical uplink control channels (PUCCHs) on the PCell and/or the SCell.

In accordance with an embodiment, a wireless relay device includes a first transceiver, a second transceiver and a processor coupled to the first transceiver and second transceivers. The processor is configured to establish a primary cell (PCell) connection with an eNB using an in band (IB) carrier via the first transceiver, establish a secondary cell (SCell) connection with the eNB via the first transceiver using an out of band (OOB) carrier after the PCell connection is established, and transmit physical uplink control channels (PUCCHs) on the PCell and/or the SCell.

In accordance with an embodiment, a non-transitory computer readable medium has an executable program stored thereon. The program instructs a processor of a wireless relay device to perform the steps of establishing a primary cell (PCell) connection with an eNB using an in band (IB) carrier, establishing a secondary cell (SCell) connection with the eNB using an out of band (OOB) carrier after establishing the PCell connection, and configuring the wireless relay device to transmit physical uplink control channels (PUCCHs) either on the PCell or on the SCell.

In accordance with an embodiment, a wireless relay device includes a first transceiver, a second transceiver, and a processor coupled to the first transceiver and second transceivers. The processor is configured to establish a primary cell (PCell) connection with an eNB via the first transceiver using an in band (IB) carrier, establish a secondary cell (SCell) connection with the eNB via the first transceiver using an out of band (OOB) carrier after the PCell connection is established, and configure the wireless relay device to transmit physical uplink control channels (PUCCHs) either on the PCell or on the SCell.

In accordance with a further embodiment, a non-transitory computer readable medium has an executable program stored thereon. The program instructs a processor of a wireless relay device to perform the steps of establishing a primary cell (PCell) connection with an eNB using an in band (IB) carrier, establishing a secondary cell (SCell) connection with the eNB using an out of band (OOB) carrier after establishing the PCell connection, and adjusting uplink feedback timing for a physical downlink shared channel (PDSCH) to a next nearest available PCell uplink subframe that satisfies a minimum time delay requirement.

In accordance with a further embodiment, a wireless relay device includes a first transceiver, a second transceiver, and a processor coupled to the first transceiver and second transceivers. The processor is configured to establish a primary cell (PCell) connection with an eNB using an in band (IB) carrier via the first transceiver, establish a secondary cell (SCell) connection with the eNB via the first transceiver using an out of band (OOB) carrier after the PCell connection is established, and adjust uplink feedback timing for a physical downlink shared channel (PDSCH) to a next nearest available PCell uplink subframe that satisfies a minimum time delay requirement.

In accordance with a further embodiment, a non-transitory computer readable medium has an executable program stored thereon. The program instructs a processor of a wireless relay device to perform the steps of establishing a primary cell (PCell) connection with an eNB using an in band (IB) carrier, establishing a secondary cell (SCell) connection with the eNB using an out of band (OOB) carrier after establishing the PCell connection, configuring an uplink subframe on the IB carrier and an uplink subframe on the OOB carrier to coincide with each other, and transmitting UCI on the IB carrier during an uplink subframe if the OOB carrier is designated to send data.

In accordance with an embodiment, a wireless relay device includes a first transceiver, a second transceiver, and a processor coupled to the first transceiver and second transceivers. The processor is configured to establish a primary cell (PCell) connection with an eNB via the first transceiver using an in band (IB) carrier, establish a secondary cell (SCell) connection with the eNB via the first transceiver using an out of band (OOB) carrier after the PCell connection is established, configure an uplink subframe on the IB carrier and an uplink subframe on the OOB carrier to coincide with each other, and transmit UCI on the IB carrier during an uplink subframe if the OOB carrier is designated to send data.

In accordance with an embodiment, a non-transitory computer readable medium has an executable program stored thereon. The program instructs a processor of a wireless relay device to perform the steps of establishing links to a base station using a first component carrier (CC) and a second component carrier, and aggregating the first CC with a first frame structure and a second CC with a second frame structure over the links to the base station. The step of aggregating includes determining a first duplexing pattern for the first CC and a second duplexing pattern for the second CC, and matching the first pattern and the second pattern. The program further instructs the processor to establish links to a user device using the first CC. The links to the user device and the links to the base station are time multiplexed on the first CC using the first duplexing pattern.

In accordance with an embodiment, a wireless relay device includes a first transceiver, a second transceiver, and a processor coupled to the first transceiver and second transceiver. The processor is configured to establish links to a base station using a first component carrier (CC) and a second component carrier via the first transceiver, and aggregate the first CC with a first frame structure and a second CC with a second frame structure over the links to the base station. In an embodiment, aggregating includes determining a first duplexing pattern for the first CC and a second duplexing pattern for the second CC, and matching the first pattern and the second pattern. The processor is further configured to establish links to a user device using the first CC using the second transceiver, wherein the links to the user device and the links to the base station are time multiplexed on the first CC using the first duplexing pattern.

In accordance with a further embodiment, a non-transitory computer readable medium has an executable program stored thereon. The program instructs a processor of a wireless relay device to perform the steps of assigning semi-static resources on a first carrier, and assigning dynamic resources on a second carrier.

In accordance with an embodiment, a wireless relay device includes a first transceiver, a second transceiver, and a processor coupled to the first transceiver and second transceivers. The processor is configured to assign semi-static resources on a first carrier, and assign dynamic resources on a second carrier.

In accordance with an embodiment, a wireless relay device includes a transceiver, and a processor coupled to the transceiver. The processor is configured to establish a first connection to a base station using a first set of frequency bands via the transceiver, and establish a second connection to a user device using the first set of frequency bands via second transceiver. In an embodiment, the transceiver includes a plurality of transceivers.

In accordance with a further embodiment, a wireless relay device includes a transceiver, and a processor coupled to the transceiver. The processor is configured to establish a primary cell (PCell) connection with an eNB using an out of band (OOB) carrier via the transceiver, establish a secondary cell (SCell) connection with the eNB using an in-band (IB) carrier after the PCell connection with the eNB is established via the transceiver, and establish a connection with a user equipment (UE) using the in-band carrier via the transceiver after the SCell connection with the eNB is established. The SCell connection with the eNB and the connection with the UE are time division duplexed on the in-band carrier. In some embodiments, the transceiver may include a plurality of transceivers.

In accordance with an embodiment, a wireless relay device includes a transceiver and a processor coupled to the transceiver. The processor is configured to establish a primary cell (PCell) connection with an eNB using an in-band (IB) carrier via the transceiver, establish a secondary cell (SCell) connection with the eNB using an out of band (OOB) carrier via the transceiver after the PCell connection is established, transmit uplink control information (UCI) on the IB carrier if an uplink resource is available on the IB carrier, and transmit UCI on the OOB carrier if the uplink resource is not available on the IB carrier. In some embodiments, the transceiver includes a plurality of transceivers.

In accordance with a further embodiment, a wireless relay device includes a transceiver and a processor coupled to the transceiver. The processor is configured to establish a primary cell (PCell) connection with an eNB using an in band (IB) carrier via the transceiver, establish a secondary cell (SCell) connection with the eNB via the transceiver using an out of band (OOB) carrier after the PCell connection is established, and transmit physical uplink control channels (PUCCHs) on the PCell and/or the SCell. In an embodiment, the transceiver includes a plurality of transceivers.

In accordance with an embodiment a wireless relay device includes a transceiver and a processor coupled to the transceiver, the processor is configured to establish a primary cell (PCell) connection with an eNB via the transceiver using an in band (IB) carrier, establish a secondary cell (SCell) connection with the eNB via the transceiver using an out of band (OOB) carrier after the PCell connection is established, and configure the wireless relay device to transmit physical uplink control channels (PUCCHs) either on the PCell or on the SCell. In an embodiment, the transceiver includes a plurality of transceivers.

In accordance with an embodiment, a wireless relay device includes a transceiver; and a processor coupled to the transceiver. The processor is configured to establish a primary cell (PCell) connection with an eNB using an in band (IB) carrier via the transceiver, establish a secondary cell (SCell) connection with the eNB via the transceiver using an out of band (OOB) carrier after the PCell connection is established, and adjust uplink feedback timing for a physical downlink shared channel (PDSCH) to a next nearest available PCell uplink subframe that satisfies a minimum time delay requirement. In an embodiment, the transceiver includes a plurality of transceivers.

In accordance with an embodiment, a wireless relay device includes a transceiver; and a processor coupled to the transceiver. The processor is configured to establish a primary cell (PCell) connection with an eNB via the transceiver using an in band (IB) carrier, establish a secondary cell (SCell) connection with the eNB via the transceiver using an out of band (OOB) carrier after the PCell connection is established, configure an uplink subframe on the IB carrier and an uplink subframe on the OOB carrier to coincide with each other, and transmit UCI on the IB carrier during an uplink subframe if the OOB carrier is designated to send data. In an embodiment, the transceiver includes a plurality of transceivers.

In accordance with an embodiment, a wireless relay device includes a transceiver; and a processor coupled to the transceiver. The processor is configured to establish links to a base station using a first component carrier (CC) and a second component carrier via the transceiver, and aggregate the first CC with a first frame structure and a second CC with a second frame structure over the links to the base station. Aggregating includes determining a first duplexing pattern for the first CC and a second duplexing pattern for the second CC, and matching the first pattern and the second pattern. The processor is further configured to establish links to a user device using the first CC using the transceiver, wherein the links to the user device and the links to the base station are time multiplexed on the first CC using the first duplexing pattern. In an embodiment, the transceiver includes a plurality of transceivers.

In accordance with a further embodiment, a wireless relay device includes a transceiver and a processor coupled to the transceiver. The processor is configured to assign semi-static resources on a first carrier, and assign dynamic resources on a second carrier. In an embodiment, the transceiver includes a plurality of transceivers.

Advantages of embodiments include aggregating different types of frequency carriers over an RN's backhaul link in such a manner that increases the data throughput, enables appropriate UL control information feedback, and reduces the number of physical layer downlink control channels required for scheduling the transmissions over multiple frequency carriers of the backhaul link.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a wireless relay device, the method comprising:
   establishing a first connection between a relay node (RN) and a base station using a first set of frequency bands, wherein establishing the first connection comprises establishing a primary cell (PCell) connection between the RN and the base station using an out of band (OOB) carrier;
   establishing a second connection between the RN and a user device using the first set of frequency bands; and
   establishing a third connection between the RN and the base station using a second set of frequency bands, wherein establishing the third connection comprises establishing a secondary cell (SCell) connection between the RN and the base station using an in-band (IB) carrier after establishing the PCell connection with the base station, and
   wherein the base station configures the SCell connection to carry control information from the RN to the base station, the control information being excluded from the PCell connection-when the base station configures the SCell connection to carry the control information.

2. The method of claim 1, wherein the base station comprises an eNB, and the user device comprises user equipment (UE).

3. The method of claim 2, further comprising operating the RN on a Long Term Evolution (LTE) network.

4. The method of claim 3, wherein the first set of frequency bands comprise in-band carriers, and the second set of frequency bands comprise out of band carriers.

5. The method of claim 1, wherein, the first set of frequency bands comprises a first pair of frequency division duplex (FDD) frequency bands, and wherein the second set of frequency bands comprises a second pair of FDD frequency bands, the second set of frequency bands being different from the first set of frequency bands.

6. The method of claim 5, wherein the first set of frequency bands are time division multiplexed between the first connection and the second connection.

7. The method of claim 1, wherein the second set of frequency bands further comprise a TDD frequency band.

8. The method of claim 1, wherein the first set of frequency bands comprise a time division duplex (TDD) frequency band, and wherein the second set of frequency bands comprises a pair of frequency division duplex (FDD) frequency bands, the second set of frequency bands being different from the first set of frequency bands.

9. The method of claim 8, wherein the first set of frequency bands comprise an in-band carrier, and wherein the second set of frequency bands comprise out of band carriers.

10. The method of claim 8, wherein the TDD frequency band is further time division multiplexed between the first and second connections.

11. The method of claim 8, wherein the second set of frequency bands further comprises a TDD frequency band.

12. The method of claim 1, wherein the first set of frequency bands comprises a pair of frequency division duplex (FDD) frequency bands, and wherein the second set of frequency bands comprises a single frequency band, the second set of frequency bands being different from the first set of frequency bands.

13. The method of claim 12, wherein the single frequency band is used to transmit downlink data using an FDD downlink frame structure.

14. The method of claim 12, wherein the single frequency band is used to transmit downlink data using a TDD downlink subframe and is used to transmit uplink data using a TDD uplink subframe, the TDD downlink subframe and the TDD uplink subframe are time division duplexed on the single frequency band according to a TDD frame structure.

15. The method of claim 1, wherein establishing the third connection to the base station using the second set of frequency bands further comprises establishing a connection with the user device using the IB carrier after establishing the SCell connection with the base station, wherein the SCell connection with the base station and the connection with the user device are time division duplexed on the IB carrier.

16. The method of claim 1, wherein the control information comprises UL Control Information (UCI) transported in a physical uplink control channel (PUCCH).

17. A method of operating a relay node (RN), the method comprising:
   establishing a primary cell (PCell) connection between the RN and an eNB using an out of band (OOB) carrier;
   after establishing the PCell connection between the RN and the eNB, establishing a secondary cell (SCell) connection between the RN and the eNB using an in-band (TB) carrier; and
   after establishing the SCell connection between the RN and the eNB, establishing a connection between the RN and a user equipment (UE) using the in-band carrier, wherein the SCell connection between the RN and the eNB and the connection between the RN and the UE are time division duplexed on the in-band carrier, and wherein the base station configures the SCell connection to carry control information from the RN to the base station, the control information being excluded from the PCell connection when the base station configures the SCell connection to carry the control information.

18. The method of claim 17, wherein establishing the SCell connection comprises:
using a RRCConnectionReconfiguration message to establish the SCell connection; and
performing subframe partitioning on the in-band carrier, wherein the subframe partitioning is used for time division duplexing between the SCell connection with the eNB and the connection with the UE.

19. The method of claim 17, wherein establishing the SCell connection comprises:
using a RNReconfiguration message to establish the SCell connection with subframe partitioning, wherein the subframe partitioning is used for time division duplexing between the SCell connection with the eNB and the connection with the UE.

20. The method of claim 17, wherein establishing the SCell connection comprises:
using a RRCConnectionReconfiguration message to establish the SCell connection; and
using a RNReconfiguration message to indicate subframe partitioning for the SCell, wherein the subframe partitioning is used for time division duplexing between the SCell connection with the eNB and the connection with the UE.

21. A wireless relay device comprising:
a transceiver; and
a processor coupled to the transceiver, the processor configured to:
establish a primary cell (PCell) connection between the wireless relay device and a base station using an out of band (OOB) carrier via the transceiver;
establish a secondary cell (SCell) connection between the wireless relay device and the base station using an in-band (IB) carrier via the transceiver after establishing the PCell connection with the base station, and
establish a second connection to a user device using the first set of frequency bands via the transceiver,
wherein the base station configures the SCell connection to carry control information from the wireless relay device to the base station, the control information being excluded from the PCell connection when the base station configures the SCell connection to carry the control information.

22. The wireless relay device of claim 21, wherein the transceiver comprises a plurality of transceivers.

23. The wireless relay device of claim 21, wherein the processor is further configured to:
establish the second connection by establishing a connection with the user device using the IB carrier via the transceiver after the SCell connection with the base station is established, wherein the SCell connection with the base station and the connection with the UE are time division duplexed on the IB carrier.

24. The wireless relay device of claim 23, wherein the processor is configured to:
establish the SCell connection by using a RRCConnectionReconfiguration message to establish the SCell connection; and
perform subframe partitioning on the IB carrier, wherein the subframe partitioning is used for time division duplexing between the SCell connection with the base station and the connection with the user device.

25. The wireless relay device of claim 23, wherein the processor is configured to establish the SCell connection by using a RNReconfiguration message to establish the SCell connection with subframe partitioning, wherein the subframe partitioning is used for time division duplexing between the SCell connection with the base station and the connection with the user device.

26. The wireless relay device of claim 23, wherein the processor is configure to establish the SCell connection by using a RRCConnectionReconfiguration message to establish the SCell connection, and by using a RNReconfiguration message to indicate subframe partitioning for the SCell, wherein the subframe partitioning is used for time division duplexing between the SCell connection with the base station and the connection with the user device.

27. The wireless relay device of claim 21, wherein the control information comprises UL Control Information (UCI) transported in a physical uplink control channel (PUCCH).

* * * * *